Patented Aug. 10, 1954

2,686,168

UNITED STATES PATENT OFFICE 2,686,168

VINYLIDENE CHLORIDE POLYMER PLASTICIZED WITH A GLYCERYL TRIESTER

Robert J. Reid, Canal Fulton, William Mayo Smith, Jr., Cuyahoga Falls, and Byron H. Werner, Akron, Ohio, assignors to The Firestone Tire & Rubber Company, Akron, Ohio, a corporation of Ohio No Drawing. Application March 11, 1953,
Serial No. 341,811

7 Claims. (Cl. 260—31.6)

This invention relates to the plasticizing of crystalline polymers and copolymers of vinylidene chloride.

The problem of providing plasticizers for vinylidene chloride polymers and copolymers is a difficult one, not heretofore solved to complete satisfaction. On account of their crystalline nature, whereby the resin molecules prefer contact with each other rather than with diluent molecules, these resins tend to reject and spew the majority of conventional plasticizing agents. Moreover these resins are processed at rather elevated temperatures, at which many conventional resin plasticizers tend to decompose even in the absence of the vinylidene chloride resin. Furthermore, many of the conventional plasticizers and their decomposition products catalyze the decomposition of the vinylidene chloride at processing temperatures.

Accordingly it is an object of this invention to provide novel and satisfactory plasticizers for incorporation into vinylidene chloride resins.

Another object is to provide such plasticizers which will be readily and stably compatible with the vinylidene cloride resins.

Another object is to provide such plasticizers which will not be adversely affected by the high temperatures of processing of crystalline vinylidene chloride resins, and which will not themselves adversely affect the vinylidene chloride resins at these processing temperatures.

A further object is to provide such plasticizers which will have a high degree of plasticizing efficiency.

A still further object is to provide such plasticizers which will be non-toxic and non-allergenic.

SYNOPSIS OF THE INVENTION

The above and other objects are secured, in accordance with this invention, by the incorporation, into crystalline resinous vinylidene chloride polymers or copolymers, of from about 0.5 to 10.0%, and preferably 2 to 5%, based on the weight of such polymers or copolymers, of glyceryl triacetate, glyceryl tripropionate, glyceryl tributyrate or mixtures of these compounds. The resultant compositions are admirably plasticized for extrusion, molding and other fabricating at and above the softening temperatures of the polymers or copolymers. These compounds do not themselves decompose, nor do they catalyze decomposition of the polymers or copolymers. This resistance to the action of heat is apparent both during the working of the compositions at high temperatures, since no acceleration of decomposition is observable during such hot working; and is also reflected by the greater stability against subsequent light aging of the products made from the compositions of this invention.

THE CRYSTALLINE VINYLIDENE CHLORIDE POLYMER AND COPOLYMERS

The resins forming the basis of the compositions of this invention are a well-known class of polymers of vinylidene chloride and copolymers thereof with not more than about 20% of other unsaturated compounds copolymerizable therewith, and correspondingly containing at least about 80% of vinylidene chloride copolymerized therein. Such resins are characterized by crystalline behavior, i. e. they fuse sharply to form relatively fluid melts which may be extruded, quenched and oriented to form strong filaments of crystalline character. A syndrome of this crystalline habit is the recalcitrance of these resins to compounding: the macromolecules of polyvinylidene chloride prefer contact with each other and tend to reject any foreign substances such as plasticizers, stabilizers and the like. It is therefore very difficult to provide suitable plasticizing agents for these resins.

As noted above, the base resin may be a homopolymer of vinylidene chloride, or a copolymer thereof with other unsaturated compounds, which copolymer must contain at least 80% of vinylidene chloride copolymerized therein. Suitable comonomers for this purpose include for example vinyl chloride, vinyl fluoride, vinyl acetate, styrene, acrylic and methacrylic esters such as methyl methacrylate, ethyl acrylate and the like, acrylonitrile, methacrylonitrile, vinyl-type ethers and ketones such as methyl vinyl ether, methyl vinyl ketone and related compounds such as methyl isopropenyl ketone and the like. For a more complete list of compounds known to copolymerize with vinylidene chloride see Krczil, "Kurzes Handbuch der Polymerisationstechnik," vol. II, "Mehrstoffpolymerization," Edwards Bros. Inc., p. 739, the items indented under "Vinyliden chlorid."

The glyceryl triacetate, tripropionate and tributyrate employed in accordance with this invention, besides serving as efficient plasticizers, also cooperate well with other compounding ingredients (heat- and light-stabilizers, lubricants, etc.) which it may be desired to incorporate into the vinylidene chloride resins. These esters do not interfere with, and in many cases actually appear to assist, the action of these other ingredients. Particularly good results are obtained with the compositions of the following range of proportions.

| | Parts by weight |
|---|---|
| Crystalline resinous polymer or copolymer of vinylidene chloride | 100 |
| Glyceryl triacetate, tripropionate or tributyrate | 3–8 |
| Phenoxy propene oxide (or nuclearly chloro-substituted product thereof containing 1–5 chlorines) | 1–3 |
| Phenyl salicylate (or alkyl-substituted product thereof containing an alkyl group of 1–10 carbons on the phenyl group) | 1–3 |

An excellent feature of the plasticizers of this invention is the fugitive character of any spew that may be formed under extreme conditions. At high temperatures of storage and use (as for instance when exposed to summer sunlight); or at relatively high concentrations of plasticizer (say 7–8% based on the weight of the resin); the compositions of this invention (similarly to all other plasticized vinylidene chloride resin compositions) may show some slight spew. However, this spew disappears shortly in the case of the glyceryl triacetate, tripropionate and tributyrate, apparently by evaporation and/or dusting off. The glyceryl tripropionate is particularly outstanding in that it is not subject to any spew at moderate temperatures even at high concentrations (7–8%); and at moderate concentrations (say up to 5%) it shows no spew even at high temperatures.

With the foregoing general discussion in mind, there are given herewith detailed examples of the practice of this invention and also, for comparison, of the use of plasticizers outside the scope of this invention. All parts given are by weight.

*Example I*

| | Parts |
|---|---|
| Copolymer of 85% vinylidene chloride 15% vinyl chloride (by weight of copolymer) | 10 |
| Glyceryl ester under test (per Table I) | 0.45 or 0.8 |

A series of test compositions was made up in accordance with the foregoing recipe, using the glyceryl triacetate, tripropionate and tributyrate plasticizers of this invention, and also various other glyceryl triesters for comparison. In each case the selected glyceryl triester and the resin, in the proportions listed in the recipe, were slurried with acetone and dried with stirring until the mass was pulverulent. The mass was then spread out to dry for 24 hours, at the end of which time the odor of acetone was no longer detectable. Tests were conducted on the compositions as follows:

*Plasticity.*—A 0.50 gram sample of the composition under test was piled upon a cellophane sheet in as steep a cone as the angle of repose would permit, and a second sheet of cellophane placed over the pile. The assembly was placed in a press having heated flat platens, and a plaque pressed out under the following conditions: platen temperature, 160° C.; schedule of pressure, 10 seconds' contact pressure, 30 seconds under a total load of 2500 pounds, release, remove the plaque and cool. The area of the resultant plaque, in square millimeters, was taken as the measure of the plasticity of the composition, and is recorded in Table I below.

*Heat stability.*—Five grams of the composition to be tested were charged into a compression mold of Hastelloy C (a 55/20/6/14/5 Ni/Mo/Fe/Cr/W alloy) in the form of a cylinder 1.25 inches in diameter. The molding cycle was (1) heat with steam at 120 pounds per square inch, and mold pressure of 1000 pounds per square inch for three minutes, (2) water cooling under 1000 pounds per square inch mold pressure for two minutes, and (3) ejection from the mold. The resultant cylindrical button (1.25 inches in diameter by .125–.188 inch in height) was then cut into sector-shaped specimens which were placed in a forced-draft oven at 180° C. Specimens were removed at intervals of 10, 20 and 30 minutes after placing in the oven, and the behavior of the specimens on the test as a whole rated subjectively by the operator as "Excellent" (E), "Good" (G), "Fair" (F) or "Poor" (P). The results are set forth in Table I hereinbelow.

*Light stability.*—The composition under test was extruded in a laboratory filament extrusion machine, quenched in a water bath, and oriented between differential-speed rolls. Conditions of operation were:

| | |
|---|---|
| Die temperature °F | 350 |
| Diameter of die orifice inch | .03 |
| Temperature of quenching bath °F | 50 |
| Ratio of speeds of orienting rolls (ratio of length of filament before and after orientation) | 1:4 |

The filament was wound on a card which was mounted in a Standard X-1-A weatherometer, using a Corex D filter and operating without the sprays. The behavior of the specimen on test was subjectively rated by the operator as "Excellent" (E), "Good" (G), "Fair" (F) or "Poor" (P). The results are set forth in Table I hereinbelow.

*Spew.*—Specimens of the filaments prepared as described above under "Light stability" were sealed in glassine bags. Two such bags were prepared from the filaments of each composition, one bag being stored at 25° C. and the other at 50° C. The bags were inspected at intervals and any spew (which showed up as clouding on the glassine paper) noted. The results observed by the operator are set forth in Table I.

TABLE I

| Plasticizer | | Plasticity (sq. mm.) | Stability | | Spew | | | | Run No. |
|---|---|---|---|---|---|---|---|---|---|
| | | | | | Stored at 25° C. | | Stored at 50° C. | | |
| Name | Parts Used NN | | Heat | Light | 24 hours | 6 months | 24 hours | 14 days | |
| Glyceryl Triacetate | 4.5 | 3,000 | G | E | none | none | some | none | 1 |
| | 8.0 | 3,000 | | | some | do | do | do | 2 |
| Glyceryl Tripropionate | 4.5 | 3,100 | G | G | none | do | none | do | 3 |
| | 8.0 | 3,400 | | | do | do | slight | do | 4 |
| Glyceryl Tributyrate | 4.5 | 2,900 | G | E | do | do | some | do | 5 |
| | 8.0 | 3,550 | | | some | do | do | do | 6 |
| Glyceryl Trilaurate | 4.5 | 3,100 | P | | heavy | heavy | heavy | heavy | 7 |
| Glyceryl Triricinoleate | 4.5 | 3,050 | P | | do | do | do | do | 8 |

From an inspection of Table I. it will be evident that the glyceryl triacetate, tripropionate and tributyrate of this invention are very distinctly superior to the higher fatty glycerides. They spew not at all at low temperatures (25° C.) and at moderate levels of concentration (runs Nos. 1, 3 and 5). Even at higher levels of concentration and temperature (runs Nos. 2, 4 and 6) the spew is slight and of an evaporative type that shortly disappears, note the items in the columns under "6 months" and "14 days." The glyceryl tripropionate is outstanding amongst the glyceryl esters of this invention, showing no spew at 25° C. and only slight spew at 50° C. even at high levels of concentration (run No. 4). No spew was observed at moderate concentration levels, either at high or at low temperatures (run No. 3). The higher glycerides showed heavy and persistent spew at moderate concentrations and at both low and high temperatures (items Nos. 7 and 8).

*Example II*

[Use with other compounding ingredients]

|  | Parts |
|---|---|
| Copolymer of 85% vinylidene chloride, 15% vinyl chloride (by weight of copolymer) | 100 |
| Glycidyl phenyl ether | 2 |
| Phenyl salicylate | 2 |
| Glyceryl triacetate, tripropionate or tributyrate | 4.5 |

Three compositions were made up in accordance with the foregoing schedule, using the glyceryl triacetate, glyceryl tripropionate and glyceryl tributyrate in the respective compositions. In each case, the selected ester and the other ingredients were ball milled together, and then hot-extruded, quenched in a water bath and stretch-oriented to produce a filament. Conditions of operation were as follows:

TABLE II

| Extruder temperatures: | |
|---|---|
| Barrel °F | 350 |
| At die °F | 360 |
| Diameter of die orifices inch | .03 |
| Temperature of quenching bath °F | 50 |
| Ratio of speeds of orienting capstans (i. e. ratio of length of filament before and after orientation) | 1:4 |

In the case of each of the compositions, the operation proceeded smoothly without clogging of the dies or other indications of poor plasticization or instability of the resin. The filamentary product had good clarity and color, and prolonged resistance to deterioration by aging in sunlight.

From the foregoing general discussion and detailed specific examples, it will be evident that the plasticizers of this invention provide efficient plasticization of the vinylidene chloride resins, are stably compatible with these resins in large proportions and do not in any interfere with the heat- and light-stability thereof. The glyceryl triacetate, tripropionate and tributyrate employed in this invention are readily and cheaply procurable.

What is claimed is:

1. A plasticized, heat- and light-resistant, stably compatible composition comprising a crystalline resin selected from the group consisting of (A) homo-polymers of vinylidene chloride and (B) copolymers of vinylidene chloride with up to 20%, based on the weight of the copolymers, of other ethylenically unsaturated compounds copolymerizable therewith, said copolymers containing at least 80% of vinylidene chloride polymerized therein, based on the weight of the copolymers, together with from 0.5 to 10.0%, based on the weight of said resin, of a compound selected from the class consisting of glyceryl triacetate, glyceryl tripropionate and glyceryl tributyrate.

2. A plasticized, heat- and light-resistant, stably compatible composition comprising a crystalline resin selected from the group consisting of (A) homo-polymers of vinylidene chloride and (B) copolymers of vinylidene chloride with up to 20%, based on the weight of the copolymers, of other ethylenically unsaturated compounds copolymerizable therewith, said copolymers containing at least 80% of vinylidene chloride polymerized therein, based on the weight of the copolymers, together with from 0.5 to 10.0%, based on the weight of said resin of glyceryl triacetate.

3. A plasticized, heat- and light-resistant, stably compatible composition comprising a crystalline resin selected from the group consisting of (A) homopolymers of vinylidene chloride and (B) copolymers of vinylidene chloride with up to 20%, based on the weight of the copolymers, of other ethylenically unsaturated compounds copolymerizable therewith, said copolymers containing at least 80% of vinylidene chloride polymerized therein, based on the weight of the copolymers, together with from 0.5 to 10.0%, based on the weight of said resin, of glyceryl tripropionate.

4. A plasticized, heat- and light-resistant, stably compatible composition comprising a crystalline resin selected from the group consisting of (A) homopolymers of vinylidene chloride and (B) copolymers of vinylidene chloride with up to 20%, based on the weight of the copolymers, of other ethylenically unsaturated compounds copolymerizable therewith, said copolymers containing at least 80% of vinylidene chloride polymerized therein, based on the weight of the copolymers, together with from 0.5 to 10.0%, based on the weight of said resin, of glyceryl tributyrate.

5. A plasticized, heat- and light-resistant, stably compatible composition, comprising:

| | Parts by weight |
|---|---|
| A crystalline vinylidene chloride resin | 100 |
| Glyceryl triacetate | 3–8 |
| A phenoxy propene oxide compound | 1–3 |
| A phenyl salicylate compound | 1–3 | said resin being selected from the group consisting of homopolymers of vinylidene chloride and copolymers thereof with up to 20%, based on the weight of said copolymers, of other unsaturated compounds copolymerizable therewith, said copolymers containing at least 80% of vinylidene chloride polymerized therein, based on the weight of the copolymers, said phenoxy propene oxide compound being selected from the group consisting of phenoxy propene oxide and nuclearly chloro-substituted phenoxy propene oxide containing 1–5 chlorines, and said phenyl salicylate compound being selected from the group consisting of phenyl salicylate and alkyl substituted phenyl salicylate having an alkyl group of from 1 to 10 carbon atoms on the phenyl group.

6. A plasticized, heat- and light-resistant, stably compatible composition, comprising:

|                                      | Parts by weight |
|--------------------------------------|-----------------|
| A crystalline vinylidene chloride resin | 100          |
| Glyceryl tripropionate               | 3-8             |
| A phenoxy propene oxide compound     | 1-3             |
| A phenyl salicylate compound         | 1-3             | said resin being selected from the group consisting of homopolymers of vinylidene chloride and copolymers thereof with up to 20%, based on the weight of said copolymers, of other unsaturated compounds copolymerizable therewith, said copolymers containing at least 80% of vinylidene chloride polymerized therein, based on the weight of the copolymers, said phenoxy propene oxide compound being selected from the group consisting of phenoxy propene oxide and nuclearly chloro-substituted phenoxy propene oxide containing 1-5 chlorines, and said phenyl salicylate compound being selected from the group consisting of phenyl salicylate and alkyl substituted phenyl salicylate having an alkyl group of from 1 to 10 carbon atoms on the phenyl group.

7. A plasticized, heat- and light-resistant, stably compatible composition, comprising:

|                                      | Parts by weight |
|--------------------------------------|-----------------|
| A crystalline vinylidene chloride resin | 100          |
| Glyceryl tributyrate                 | 3-8             |
| A phenoxy propene oxide compound     | 1-3             |
| A phenyl salicylate compound         | 1-3             | said resin being selected from the group consisting of homopolymers of vinylidene chloride and copolymers thereof with up to 20%, based on the weight of said copolymers, of other unsaturated compounds copolymerizable therewith, said copolymers containing at least 80% of vinylidene chloride polymerized therein, based on the weight of the copolymers, said phenoxy propene oxide compounds being selected from the group consisting of phenoxy propene oxide and nuclearly chloro-substituted products thereof containing 1-5 chlorines, and said phenyl salicylate compound being selected from the group consisting of phenyl salicylate and alkyl substituted products thereof having an alkyl group of from 1 to 10 carbon atoms on the phenyl group.

References Cited in the file of this patent

UNITED STATES PATENTS

| Number    | Name     | Date          |
|-----------|----------|---------------|
| 2,459,746 | Radcliffe | Jan. 18, 1949 |